(12) United States Patent
Mora Vallejo

(10) Patent No.: US 6,648,938 B1
(45) Date of Patent: Nov. 18, 2003

(54) DEVICE FOR CLEANING FLUID IN THE FORM OF VAPOR FROM A CIRCUIT

(76) Inventor: Nicasio Paulino Mora Vallejo, Ctra. De las Labores s/n, 13670 Villarrubia de los Ojos Ciudad Real (ES)

(*) Notice: Subject to any disclaimer, the term of this patent is extended or adjusted under 35 U.S.C. 154(b) by 0 days.

(21) Appl. No.: 09/937,155

(22) PCT Filed: Oct. 22, 1999

(86) PCT No.: PCT/ES99/00339

§ 371 (c)(1),
(2), (4) Date: Sep. 20, 2001

(87) PCT Pub. No.: WO00/59605

PCT Pub. Date: Oct. 12, 2000

(30) Foreign Application Priority Data

Mar. 31, 1999 (ES) .............................. 9900649
May 14, 1999 (ES) .............................. 9901029

(51) Int. Cl.⁷ .............................................. B01D 45/08
(52) U.S. Cl. ............................. 55/423; 55/465; 159/31; 96/189
(58) Field of Search .................. 55/423, 462, 465, 55/DIG. 23; 159/31; 202/197; 203/40; 96/189

(56) References Cited

U.S. PATENT DOCUMENTS 1,416,215 A * 5/1922 Kirkup ........................ 95/272
1,474,056 A * 11/1923 Ostermann ................... 96/325
4,417,951 A * 11/1983 Stanisic et al. .............. 202/197

FOREIGN PATENT DOCUMENTS

| CH | 645277 | 9/1984 |
|---|---|---|
| CH | 0645277 A | 9/1984 |
| JP | 11076723 A | 3/1999 |

OTHER PUBLICATIONS

Patent Abstract of Japan, vol. 1999, No. 08, Jun. 6, 1999, JP 11076723 A (Mitsubishi Electric Corp. et al).

* cited by examiner

*Primary Examiner*—Robert A. Hopkins
(74) *Attorney, Agent, or Firm*—Horst Kasper

(57) ABSTRACT

An apparatus for cleaning a fluid in the form of steam from a circuit in which a given flow of water vapour is generated and led to a separator (1) and thence to a cooler or a condenser or it is discharged into the atmosphere, said separator (1) comprising a closed volume (2), a steam inlet duct (4) and a steam outlet duct (5) opposite one another on said closed volume (2) incorporating a tabular element (3) lying below the vertical and sloping downward in relation to said steam inlet (4), forming a channel (6) at the bottom with a discharge pipe (7) which moves the liquefied substances and particles adhered to said tabular element (3) to the bottom of said closed volume (2) from where they are removed through drains (8).

6 Claims, 3 Drawing Sheets

DEVICE FOR CLEANING FLUID IN THE FORM OF VAPOR FROM A CIRCUIT

OBJECT OF THE INVENTION

These Specifications refer to an apparatus for cleaning a fluid in the form of steam from a circuit, whose utility lies in separating the chemical compounds in the water from industrial process tailings, particularly those generated by industries incorporating electrolysis processes.

The invention provides purified water in line with the terms of the current provisions on industry-generated waste water, its operation being based on the distillation of such waste water at low temperature in a controlled atmosphere.

In summary, the invention can be used not just to clean sewer and industrial waters but also to clean any industrial waste which may be mixed in the steam, operating downstream from the output of any steam jet to complete the steam treatment operation as such.

The invention also allows separation of chemical compounds in water from industrial process tailings, especially in industries using electrolysis, and in all types of industries whose normal operation creates waste water requiring treatment for subsequent disposal.

The invention provides treated water in line with the current regulations on industrial-origin waste water, and is based on the distillation of such waste water at low temperatures in a controlled atmosphere.

FIELD OF THE INVENTION

This invention is usable in industries manufacturing elements, devices and systems applicable to the treatment of waste water, specifically in that dedicated to the treatment of industrial-origin waste water: it may also be used to clean any industrial waste which may be incorporated or mixed in to the steam.

PRIOR ART

The applicant is familiar with many devices and systems which can be used to recycle industrial waters: the most widely-used are those which precipitate the elements dissolved in the medium by varying the conditions of acidity, redox potential, oxygen concentration, or temperature.

These systems require subsequent processing of the flows treated to eliminate traces of compounds which are hard to precipitate: it is sometimes virtually impossible to regenerate the flow of polluted water.

Procedures are also known for osmosis and reverse osmosis-based water treatments applicable to specific cases and, given such specificity, not widespread in industry.

The applicant is aware of treatment procedures based on the distillation of liquid wastes, fundamentally developed to desalinate sea-water to make it drinkable or to provide water for irrigation.

These distillation treatment procedures are based on heating the effluent, generally water, in closed volumes. Such effluent contains chemicals in dissolution whose steam pressure is greater than that of the water, which is thus evaporated and separated from the remaining chemical compounds.

Subsequent condensation of the steam from the separated water enables it to be restored to the liquid state, virtually free of traces of compounds in its composition, to the extent that it is common to add certain compounds to the water treated to render it drinkable.

The procedure described, fully familiar to any specialist in the field, uses large amounts of energy, needed to raise the temperature of the liquid beyond evaporation point, which is dependent on the pressure in the vessel where the procedure takes place.

The applicant is not aware of the existence of any procedure using distillation to treat waste water, and is specifically unaware of any device usable for these purposes on industrial waters from industrial electrolysis processes and whose characteristics are suitable for its application.

Nor is the applicant familiar with any current invention which can be used not just to clean sewer and industrial waste water but also any industrial waste which may be incorporated or mixed in to the steam.

DESCRIPTION OF THE INVENTION

The apparatus for cleaning fluid in the form of steam from a circuit, as proposed in the invention, constitutes an evident novelty in its field of application, providing a device able to treat industrial liquid effluent, principally that from industries incorporating electrolysis processes, by evaporating the water in closed volumes by heating at controlled atmospheric pressure.

In specific terms, the invention is based on an evaporation chamber where internal pressure and temperature conditions can be varied so as to reduce the water steam pressure to a point where it will evaporate at around 30° C., making use of the excess heat flows from the industrial processes generating the effluent and even of their exhaust temperatures to evaporate it.

It is vital that the liquid effluents should not contain dissolved compounds of less density than the water or, if they are present, they are not prohibited in treated water under the industrial waters legislation.

The evaporation chamber, fed from a suitable tank, provides a given flow of water vapour which leads to a separator, and a flow of dense, unevaporated compounds which are placed in a suitable separate vessel.

The separator is included to provide a second separation of compounds whose steam pressure is slightly higher than that of water vapour, and of any solid particles which may be dragged along with the flow.

The separator comprises a volume with two accesses on opposite sides where the water vapour enters and exits: it has a tabular element located below the vertical opposite the water vapour input, sloping downward and with a channel at the bottom, so that the water vapour impacts against said tabular element and the solid particles adhere and the temperature drops, liquefying the compounds whose steam pressure is slightly above that of the water, and which are collected in the lower channel and evacuated through the appropriate drains.

The water vapour flow, accelerated by suction fans, then runs to a cooler which liquefies the water vapour so that it can run into public channels or be fed back into the industrial processes from which it came.

Optionally, the water vapour can be freely expelled into the atmosphere, without the need for the cooler mentioned above.

The invention applies preferably to effluents from electrolysis plants whose characteristics are suitable for treatment by the apparatus to clean a fluid in the form of steam delivered from a circuit which is the subject of these Specifications: it should be installed close to such plants in order to make use of the heat generated during electrolysis and in the associated machinery.

The invention can also be used to clean any industrial waste which may be mixed in to the steam.

It must also be pointed out that the invention may optionally comprise an evaporation chamber where internal pressure and temperature conditions can be varied, to reduce the water vapour pressure to a point where it can evaporate at temperatures of about 30° C.: also as an option, surplus heat flows from the industrial processes generating these effluents can be used, as can their exhaust heat, to evaporate them.

It is of the greatest importance that the liquid effluents should not contain dissolved compounds of less density than the water or, if they do, such compounds are not prohibited in treated water under the industrial waters legislation.

The evaporation chamber, supplied from a suitable tank, provides a certain flow of water vapour, which runs to a separator, and a flow of dense unevaporated compounds which are deposited in a suitable separate vessel.

The separator is included to provide a second separation of compounds whose steam pressure is slightly higher than that of water vapour, and of any solid particles which may be dragged along with the flow.

The separator comprises a volume with two accesses on opposite sides where the water vapour enters and exits: it has a tabular element located below the vertical opposite the water vapour input, sloping downward and with a channel at the bottom, so that the water vapour impacts against said tabular element and the solid particles adhere and its temperature drops, liquefying the compounds whose steam pressure is slightly above that of the water, which are collected in the lower channel and evacuated through the appropriate drains.

The water vapour flow, accelerated by suction fans, then runs to a cooler which liquefies the water vapour so that it can run into public channels or be fed back into the industrial processes from which it came.

Optionally, the water vapour can be freely expelled into the atmosphere, without the need for the cooler mentioned above.

The invention applies preferably to effluents from electrolysis plants whose characteristics are suitable for treatment by the purifier of industrial waste waters using evaporation, applicable for the regulation of pH and the elimination of pollutant gases, which is the subject of these Specifications: it should be installed close to such plants in order to make use of the heat generated during electrolysis and in the associated machinery.

In summary, the invention takes the form of a system which can regulate pH without any need to add chemical products since the purification treatment itself can be performed mechanically, along with the regulation of the pH and the elimination of pollutant gases.

DESCRIPTION OF THE DRAWINGS

To complete this description and to assist in a better understanding of the characteristics of the invention, these Specifications are accompanied by a set of drawings, forming an integral part hereof which, by way of illustration and without limitation, represent the following.

A PREFERRED EMBODIMENT OF THE INVENTION

Figure 1:
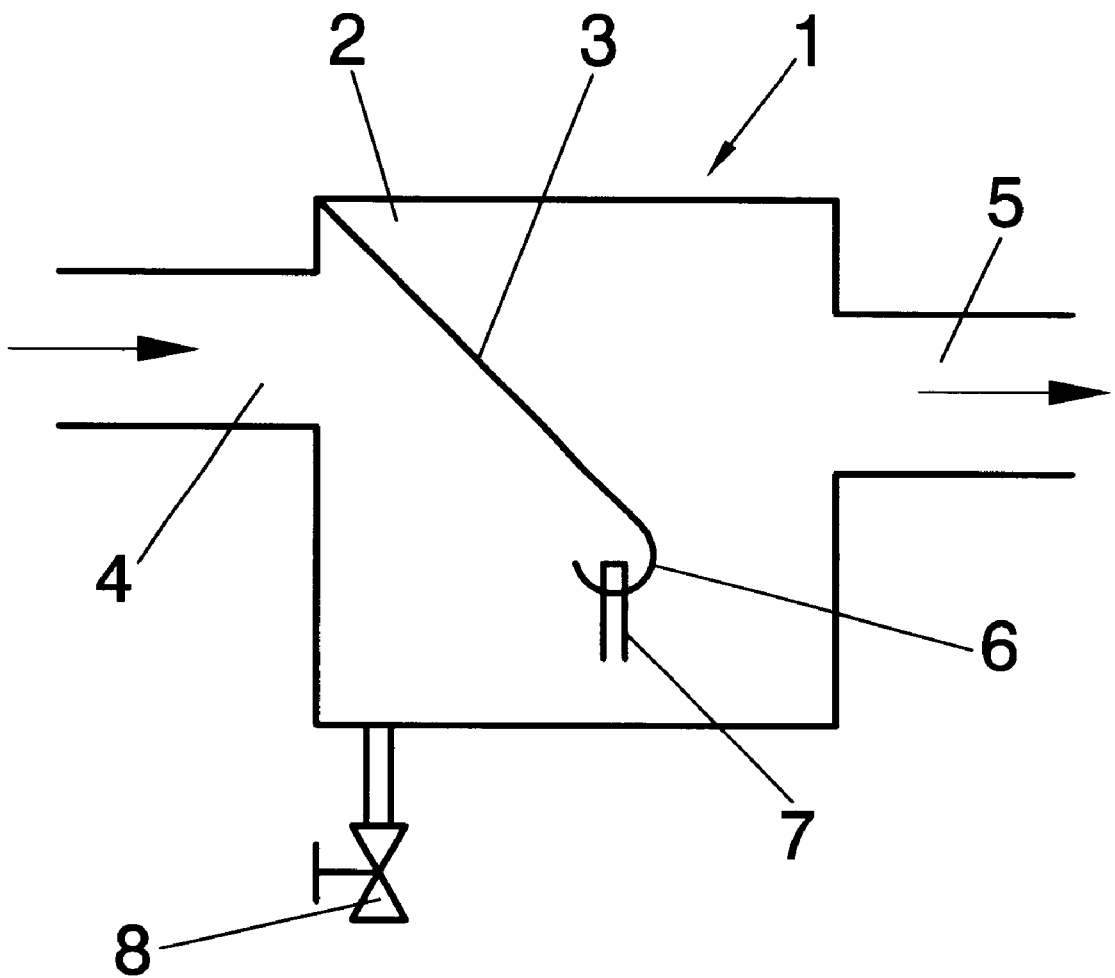
FIG. 1 is a diagrammatic view of the apparatus for cleaning fluid in the form of steam from a circuit, which is the object of this invention, comprising a separator, in which said diagrammatic view shows the location and construction of the tabular element of said fluid-cleaning apparatus.
Figure 2:
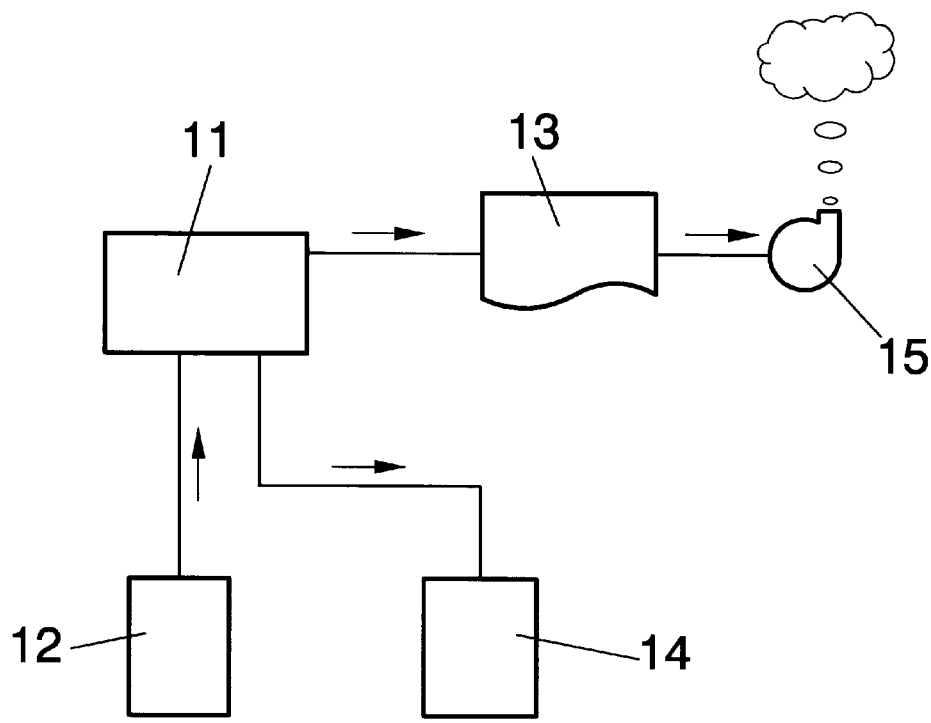
FIG. 2 is a diagram of the invention showing the embodiment of a purifier to treat industrial waste water by evaporation, usable to adjust pH and remove pollutant gases, which delivers the water vapour directly into the atmosphere, without prior cooling.
Figure 3:
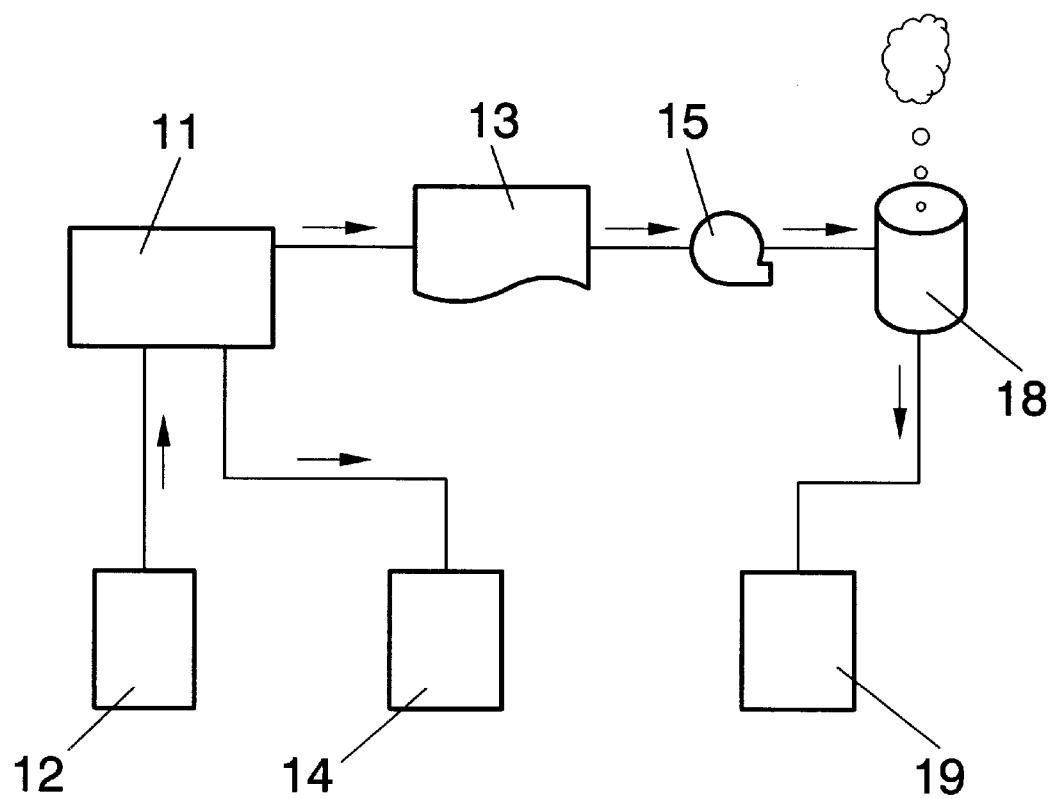
FIG. 3 is a diagram of a purifier to treat industrial waste water by evaporation, usable to adjust pH and remove pollutant gases, which delivers part of the water vapour directly into the atmosphere, while the remainder is liquefied.
Figure 4:
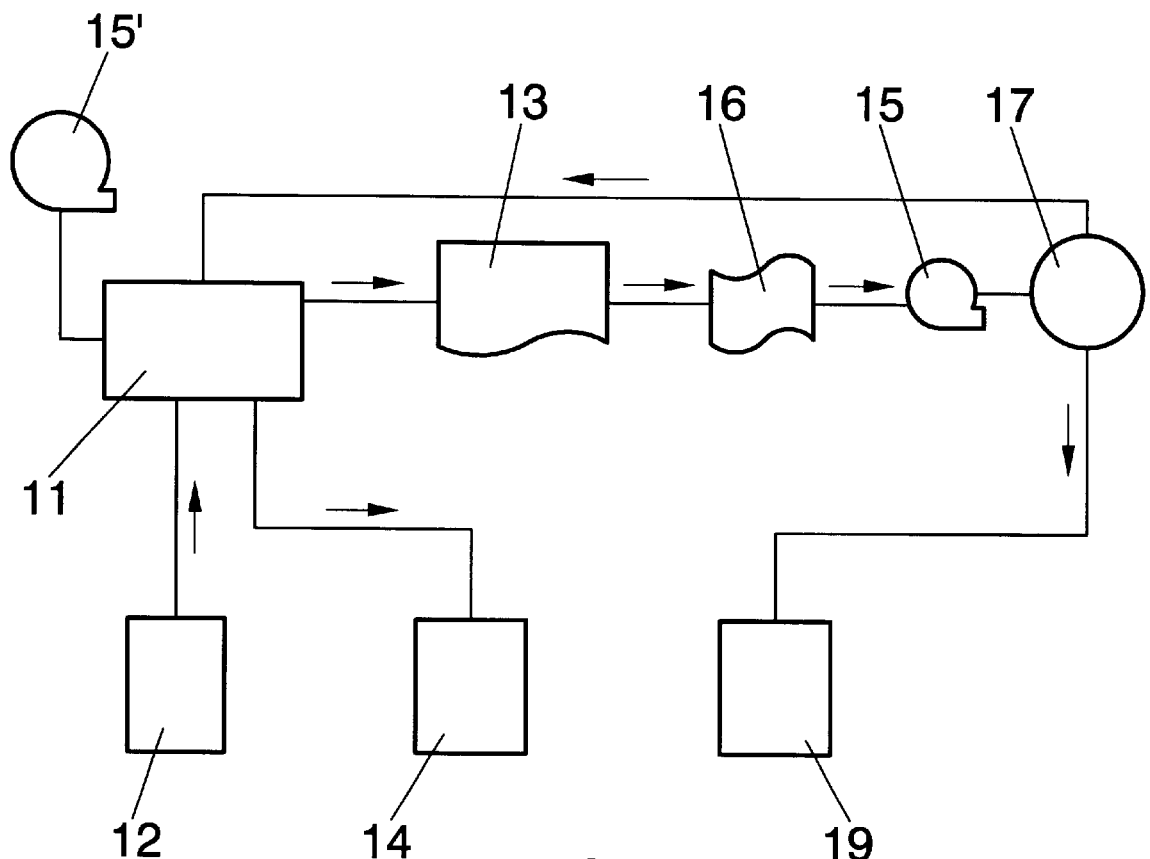
FIG. 4 is a third embodiment of the invention in which all the water vapour is liquefied.
Figure 5:
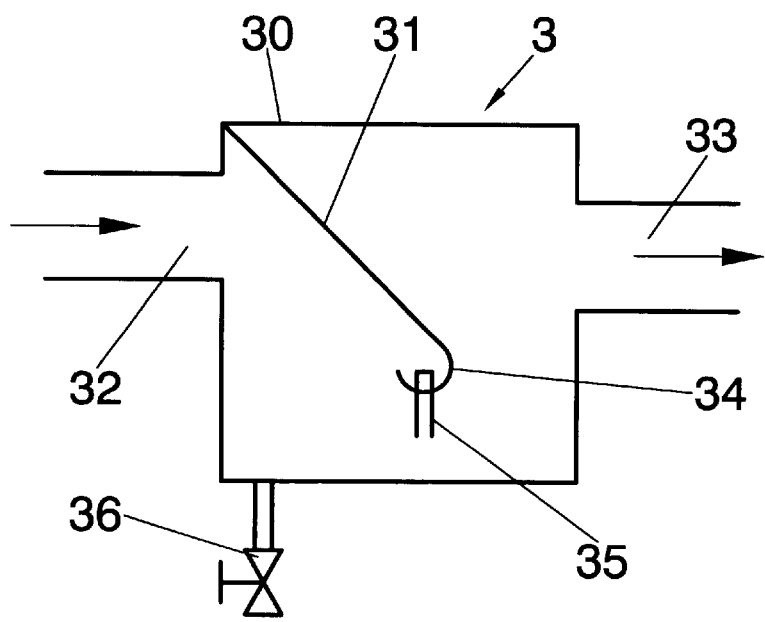
FIG. 5 shows a diagram of the separator, illustrating the location and construction of the tabular element of the invention.

FIG. 1 shows how the apparatus for cleaning a fluid in the form of steam from a circuit consists of a housing or separator (1) made of a closed volume (2), a steam inlet duct (4) and a steam outlet duct (5) opposite one another on said closed volume (2), and a tabular element (3) lying below the vertical and sloping downward in relation to said steam inlet (4), forming a channel (6) at the bottom with a discharge pipe (7) which moves the liquefied substances and particles adhered to said tabular element (3) to the bottom of said closed volume (2) from where they are removed through drains (8).

The invention can be used not just to clean sewage or industrial waste water but also any industrial waste which may be mixed in with the steam.

The invention, and specifically the housing (2) of the apparatus (1) is placed or situated at the discharge from any stem jet, to treat the steam as such.

FIGS. 2, 3, 4 and 5 show how a second embodiment of the invention is based on an evaporation chamber (11) fed from a tank (12) where a given flow is generated of water vapour which may optionally be accelerated by a blower (15') leading it to a separator (13) which generates a current of water vapour and, from there, by an aspirator (15), to a cooler (18), a condenser (17) or into the atmosphere.

The invention includes a concentrates tank (14) which collects the unevaporated compounds in the evaporation chamber (13) and, optionally, a standard steam cleaner (16).

The evaporation chamber (11) takes the form of a closed volume where a given quantity of effluent from industrial processes is heated using conventional means and kept under the appropriate conditions of pressure to allow the water to evaporate at less than 30°.

The separator (13) takes the form of a closed volume (30) with a steam inlet duct (32) and a steam outlet duct (33) opposite each other on said closed volume (30), and incorporating a tabular element (31) situated below the vertical and sloping downward in relation to said steam inlet (32), a channel at the bottom (34) with a discharge pipe (35) which leads the liquefied substances and particles adhered to said tabular element (31) to the bottom of said closed volume (30) from where they are removed through drains (36).

It must be repeated that the invention is designed as a system which is able to regulate pH precisely without any need to add chemical products since, given the features of the invention, the pH is regulated and the pollutant gases are eliminated mechanically.

What is claimed is:

1. An apparatus for cleaning steam from a circuit, comprising a tank containing water, an evaporation chamber for generating water vapor, wherein the evaporation chamber is in fluid communication with the tank for feeding water to the evaporation chamber, which water vapor may optionally be accelerated by a blower, leading the water vapor to a separator (2) which separates a current of water vapour and thence the water vapor is delivered through an aspirator to a cooler or condenser or the water vapor is released into the atmosphere, incorporating a concentrates tank which collects unevaporated compounds in said evaporation chamber (1) and, optionally, a conventional steam cleaner disposed between the separator and the blower, wherein said separator (1) comprises a closed volume (2) with a steam inlet duct (3) and a steam outlet duct (4) opposite each other on said closed volume (2), and incorporating a tabular element (3) placed below the vertical and sloping downward in relation to said steam inlet (3), with a channel (6) at the bottom of said closed volume (2), which channel has a discharge pipe (7) to carry the liquefied substances and particles adhered to the tabular element (3) to the bottom of said closed volume (2) from where the liquefied substances and particles adhered are removed through a drain (8).

2. The apparatus for cleaning a fluid in the form of steam from a circuit as set forth in claim 1 further comprising
    mechanical means for regulating a pH; and mechanical means for eliminating pollutant gases without a need to add chemical products since these operations of regulating and of eliminating are performed entirely mechanically.

3. An apparatus for cleaning steam from a circuit comprising
    a tank containing water;
    an evaporation chamber for generating water vapor, wherein the evaporation chamber is in fluid communication with the tank for feeding water to the evaporation chamber;
    a separator connected to the evaporation chamber, wherein the water vapor is led from the evaporation chamber to the separator (2), wherein the separator (2) separates a current of water vapor;
    an aspirator connected to the separator (2), wherein the water vapor is delivered from the separator (2) to the aspirator;
    a cooler or condenser or water vapor release means for releasing the water vapor into an atmosphere;
    a concentrates tank connected to the evaporation chamber for collecting non-evaporated compounds left in said evaporation chamber (1);
    a closed volume (2) comprised in the separator (1);
    a steam inlet duct (3) and a steam outlet duct (4) connected to the closed volume (2) and disposed opposite to each other relative to said closed volume (2), wherein a tabular element (3) is incorporated into the closed volume (2) and placed below the vertical and sloping downward in relation to said steam inlet (3);
    a channel (6) disposed at the bottom of said closed volume (2);
    a discharge pipe (7) furnished to the channel (6) for carrying liquefied substances and particles adhered to the tabular element (3) to the bottom of said closed volume (2);
    a drain (8) connected to the bottom of the closed volume (2), wherein the liquefied substances and particles adhered are removed from the bottom of the closed volume (2) through the drain (8).

4. The apparatus for cleaning steam from a circuit according to claim 3 further comprising
    a blower disposed between the evaporation chamber and the separator for accelerating the water vapor coming from the evaporator and for delivering accelerated water vapor to the separator.

5. The apparatus for cleaning steam from a circuit according to claim 4 further comprising
    a conventional steam cleaner disposed between the separator and the blower.

6. An apparatus for cleaning steam from a circuit comprising
    a tank containing water;
    an evaporation chamber for generating water vapor, wherein the evaporation chamber is in fluid communication with the tank for feeding water to the evaporation chamber;
    a separator connected to the evaporation chamber, wherein the water vapor is led from the evaporation chamber to the separator (2), wherein the separator (2) separates a current of water vapor;
    a cooler or condenser or water vapor release means for releasing the water vapor into an atmosphere;
    a concentrates tank connected to the evaporation chamber for collecting non-evaporated compounds left in said evaporation chamber (1);
    a closed volume (2) comprised in the separator (1);
    a steam inlet duct (3) and a steam outlet duct (4) connected to the closed volume (2) and disposed opposite to each other relative to said closed volume (2), wherein a tabular element (3) is incorporated into the closed volume (2) and placed below the vertical and sloping downward in relation to said steam inlet (3);
    a channel (6) disposed at the bottom of said closed volume (2);
    a discharge pipe (7) finished to the channel (6) for carrying liquefied substances and particles adhered to the tabular element (3) to the bottom of said closed volume (2);
    a drain (8) connected to the bottom of the closed volume (2), wherein the liquefied substances and particles adhered are removed from the bottom of the closed volume (2) through the drain (8).

* * * * *